Dec. 9, 1930.   J. H. QUISENBERRY   1,784,075
ELECTRODE HOLDER
Filed Nov. 6, 1929
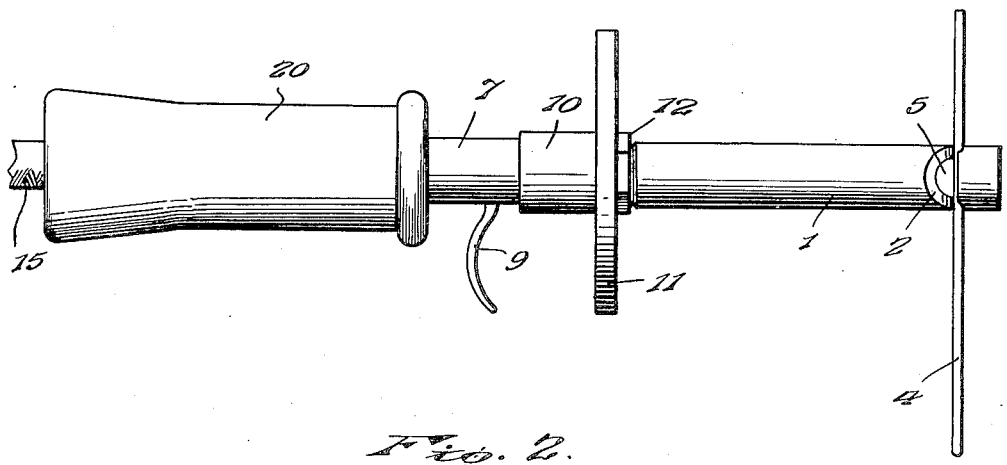
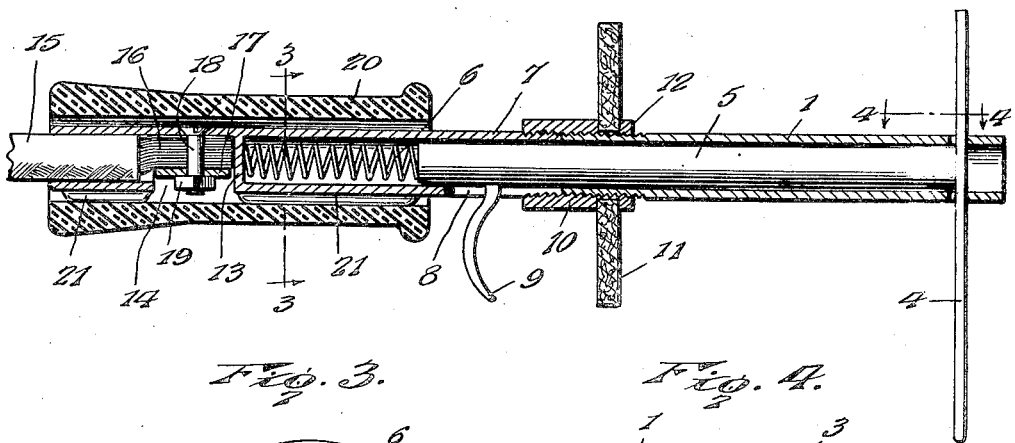
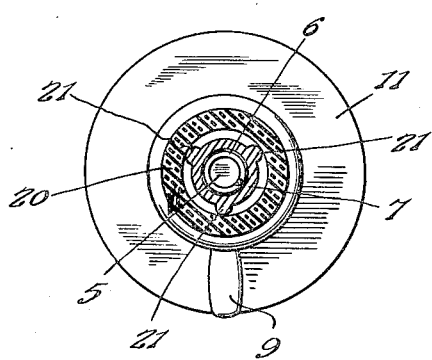
J. H. Quisenberry.
INVENTOR.
BY Lacey & Lacey,
ATTORNEYS Patented Dec. 9, 1930

1,784,075

UNITED STATES PATENT OFFICE

JAMES H. QUISENBERRY, OF LOUISVILLE, KENTUCKY, ASSIGNOR OF ONE-HALF TO ROBERT S. JOHNSON, OF LOUISVILLE, KENTUCKY

ELECTRODE HOLDER

Application filed November 6, 1929. Serial No. 405,203.

The present invention has for its object the provision of a simple and inexpensive device particularly designed for holding a wire of welding material in welding operations, the object of the invention being to provide a device which will firmly hold the welding rod or wire and by which the transmission of a shock to the operator will be avoided. Another object is to provide a structure in which the parts may be easily assembled or disassembled, and other objects will appear incidentally in the course of the following description. The invention is illustrated in the accompanying drawing and consists in certain novel features which will be particularly defined in the appended claims.

In the drawing:

Figure 1 is an elevation of a holder embodying the invention,

Fig. 2 is a longitudinal section of the same,

Fig. 3 is a transverse section on the line 3—3 of Fig. 2, and

Fig. 4 is a detail elevation with a part in section on the line 4—4 of Fig. 2.

In carrying out the invention, there is provided a metal tube 1 which is open at its ends and which near one end is constructed with a slot or notch 2 extending across the tube and having recesses 3 formed in its forward walls to receive the welding wire or rod 4 which is to be clamped therein in use. A plunger 5 is fitted within the tube 1, as shown clearly in Fig. 2, and is yieldably projected by a spring 6 to hold the front end of the plunger against the wire and maintain it in the recesses 3, as will be understood upon reference to Fig. 4. The inner or rear end of the plunger 5 seats within an inner tube 7 which is open at its forward end and provided with a longitudinal slot 8 receiving the handle 9 on the plunger which extends radially from the plunger and is adapted to play in the slot, as will be understood upon reference to Fig. 2. The forward end of the inner tube 7 and the rear end of the outer tube 1 are externally threaded to be engaged by a coupling sleeve 10 whereby the tubes may be secured together in alinement after the plunger has been seated in the inner tube. A shield 11 of fiber is also mounted upon the outer tube immediately adjacent the front end of the coupling sleeve 10 and bears against a washer or nut 12 which is also fitted on the threaded portion of the front or outer tube. In assembling the parts, the washer 12 is placed upon the front or outer tube and the disk 11 is then fitted over the tube against the washer, the coupling sleeve being then engaged with the tube at the rear of the disk and the plunger and rear or inner tube being then brought into position with the two tubes alined and the plunger projecting into the forward tube. When the coupling has been turned home, the parts will be firmly held together and the rear end of the coupling will serve as a stop to limit the forward movement of the plunger under the influence of the spring 6 so that the bending of the electrode or welding wire will be avoided, although said element will be very firmly held. Upon referring to Fig. 2 more particularly, it will be noted that the rear or inner tube 7 has a transverse web 13 at an intermediate point of its length which web constitutes an abutment for the expansion spring 6 which bears constantly against said abutment and against the inner end of the plunger. At the rear of the web 13, the tube 7 is interrupted or cut away to provide an open space 14 within which the end of the cable 15 may be clamped in position. The circular extent of the tube is resumed at the rear extremity thereof so as to provide a holder or eye in which the end of the insulated cable may be inserted and the ends of the strands constituting the cable are disposed within the open space 14, as shown at 16. A metallic washer 17 is disposed against the exposed strands of the cable and a clamping screw or bolt 18 is inserted through the wall of the tube and through the cable as well as through said washer or clamping plate, a nut 19 being fitted upon the end of the screw and adapted to be turned home against the plate 17 so that the strands of the electric cable may be firmly clamped against the wall of the tube at the rear of the abutment web 13. A tubular handle 20 of wood or fiber or other insulating material is fitted upon the rear end of the tube 17 and encloses the same and the end of the cable, the tube being provided upon its outer circumference with longitudinal ribs 21 whereby the handle will be held in spaced relation to the tube and an open-ended chamber will be provided for the free circulation of air to prevent the handle becoming heated so that it cannot be comfortably held. The fiber disk 11 also constitutes a shield to protect the hand of the user against possible flying sparks or pieces of hot metal.

When the device is to be used, the welding wire or rod 4 is slipped sidewise through the slot 2 and seated in the recesses 3, the plunger at this time being retracted. As soon as the welding wire seats in the recesses 3, the hold upon the plunger is released, whereupon the spring 6 expands and causes the plunger to firmly clamp the wire in its seat. The tool is now ready for use and the welding circuit will be established when the end of the welding rod or wire 4 is brought into contact with the spot to be welded, the current then passing from the cable strands 16 through the metal of the tubes 7 and 1 to the wire and thence to the metal parts which are to be welded.

It will be seen at once that I have provided an exceedingly simple and efficient tool which may be produced at a low cost and may be easily operated without fatigue upon the user. The insulated handle and the shield or guard 11 provide ample protection for the user and the possibility of the user receiving a shock is very slight unless he should be exceedingly careless inasmuch as no current flows until the welding rod is brought into contact with the parts to be welded at which time the operator should have his attention concentrated upon his work.

Having thus described the invention, I claim:

1. An electrode holder comprising alined tubes, seats in the forward tube adjacent the front end of the same for receiving a welding rod, means for coupling the tubes, the rear tube having a longitudinal slot at its front end, a plunger slidably fitted in the tubes and adapted to engage a welding rod to hold the same in the seats in the forward tube, a handle projecting from the plunger through the slot in the rear tube, and an expansion spring housed in the rear tube at the rear of the plunger and bearing upon the plunger.

2. An electrode holder comprising a tubular member having a seat at its front end to receive transversely a welding rod, a plunger mounted in the tubular member and arranged to bear against the welding rod to hold it in the seat, an abutment on the tubular member at the rear of the plunger, an expansion spring housed in the tube between said abutment and the plunger, an electric cable having its strands disposed against the material of the tube at the rear of said abutment, means for clamping the strands to the tube, and a tubular handle encircling the rear portion of the tubular member, said tubular member being provided externally with longitudinal ribs spacing the handle from the tubular member.

In testimony whereof I affix my signature.

JAMES H. QUISENBERRY. [L. S.]